United States Patent [19]
Bourgeois

[11] Patent Number: 4,801,979
[45] Date of Patent: Jan. 31, 1989

[54] DEVICE FOR COPYING MICROFICHE
[75] Inventor: Rodney M. Bourgeois, LaCombe, La.
[73] Assignee: Innovative Technology, Inc., LaCombe, La.
[21] Appl. No.: 137,343
[22] Filed: Dec. 23, 1987
[51] Int. Cl.$^4$ .................. G03B 27/30; G03B 27/10
[52] U.S. Cl. ................................ 355/106; 355/110
[58] Field of Search .............. 355/83, 90, 104, 106, 355/110, 111

[56] References Cited
U.S. PATENT DOCUMENTS

| | | | |
|---|---|---|---|
| 3,094,057 | 6/1963 | Maurer | 355/90 |
| 3,168,027 | 2/1965 | Mastroianni | 355/104 |
| 3,447,872 | 6/1969 | Pfaff | 355/110 |
| 3,472,592 | 10/1969 | Nichols et al. | 355/83 |
| 3,580,677 | 5/1971 | Seelenbinder | 355/110 |
| 3,582,207 | 6/1971 | Johnson et al. | 355/90 |
| 3,639,060 | 2/1972 | Jaskowsky | 355/104 |
| 3,655,184 | 4/1972 | Seelenbinder | 355/110 X |
| 3,687,550 | 8/1972 | Koguchi et al. | 355/110 X |
| 3,690,766 | 9/1972 | Lunde | 355/111 |
| 3,704,069 | 11/1972 | Kitch | 355/110 |
| 3,715,159 | 2/1973 | Allport | 355/110 |
| 3,728,024 | 4/1973 | Nagai | 355/110 |
| 3,749,491 | 7/1973 | Maxfield et al. | 355/106 |
| 3,751,165 | 8/1973 | Inoue et al. | 355/108 |
| 3,762,814 | 10/1973 | Kitch | 355/110 X |
| 3,811,772 | 5/1974 | Kanayama et al. | 355/111 |
| 3,853,401 | 12/1974 | Inoue et al. | 355/106 |
| 4,131,364 | 12/1978 | Moreno | 355/110 X |
| 4,176,949 | 12/1979 | Burgess | 355/104 |
| 4,209,251 | 6/1980 | Schroeder et al. | 355/110 |
| 4,252,437 | 2/1981 | Hans | 355/104 |
| 4,265,533 | 5/1981 | Gasse | 355/110 |

Primary Examiner—Richard A. Wintercorn
Attorney, Agent, or Firm—Parkhurst, Oliff & Berridge

[57] ABSTRACT

The invention is directed to a method and apparatus for copying images on a master microfiche film into a copy microfiche film. An apparatus in accordance with the present invention comprises an endless tensioning belt threaded around belt rollers, the tensioning belt pressing the master film and the copy film into intimate contact with each other and with an exposure surface, such that there is substantially no slippage between the exposure surface, the master film, the copy film and the tensioning belt. After leaving the exposure station, the copy film is passed through a development section and then through a cooling section. Drive means are provided for driving the copy film. In one aspect of the present invention, the master film and the tensioning belt are passively driven by the drive means by virtue of contact between the copy film and each of the master film and the tensioning belt, and the exposure surface is rotated by virtue of contact with the master film. Helical grooves are preferably formed in the surfaces of the belt rollers such that the grooves converge or diverge relative to the tensioning belt. The cooling section preferably comprises air knife units having slots formed therein through which pressurized, filtered air is passed to contact said copy film and a rotatable, cylindrical chill drum having a plurality of cylindrical holes formed therethrough, through which cooling air is blown.

41 Claims, 8 Drawing Sheets

DEVICE FOR COPYING MICROFICHE

BACKGROUND OF THE INVENTION

1. Field of the Invention

The present invention is directed to film processing, and more specifically, to devices and methods for high speed microfiche duplication in which a master film and a copy film are brough together and light is passed through the master film to expose the copy film.

2. Description of the Prior Art

The storage of information on microfiche is a particularly popular practice. Typically, a film of microfiche has a plurality of microfiche frames arragned thereon, one or more frames acrosss the width of the film and many frames along the length of the film, i.e., as a column or columns. The film is generally stored by winding film around a cylindrical surface, e.g., a spool, to form a roll of film.

The need to copy microfiche film frequently arises. For many years, the designs of microfiche copiers have been changed in attempts to increase the rate at which fiche are copied, to improve copy quality and to reduce man-power demands. It is not uncommon for installationsto have as many as 50 or more machines being operated simultaneously by 20 or more persons, each machine copying fiche at a maximum rate of about 1000 fiche/hour.

There are three primary types of film used for copying from a master film of microfiche, namely, silver film, diazo film and vesicular film. Diazo film is currently used as the copy film for more than a majority of microfiche copying. Silver film is muchmore expensive (about four times) than diazo film, and vesicular film, which is exposed by being subjected to ultraviolet light and heat, does not have a dark background, which is frequently desirable. Diazo film is exposed by being subjected to ultraviolet light and produces copies having dark backgrounds. When copying onto diazo film, it is not necessary that the film be heated and a dark room is not necessary.

Considerable research and development has been conducted in attempts to develop a machine which provides more rapid duplication of microfiche, without sacrificing the quality of the copies made. There is a continuing need for improved microfiche copiers which are capable of rapidly producing copies of microfiche having good quality and which do not require extensive surveillance or complex manual adjustment by operators.

SUMMARY OF THE INVENTION

The present invention is directed to devices and method for making good quality copies of microfiche at rapid rates of reproduction. The present invention is also directed to providing such a machine which is relatively simple to operate. A device in accordance with the present invention comprises:

a master payout station from which master film is supplied;

a copy payout station from which copy film is supplied to form a master film-copy laminate;

an exposure station comprising an ultraviolet ray source and an exposure surface over which the master film and the copy film pass, such that ultraviolet light from the ultraviolet ray source passes through the exposure surface and the master film and then exposes the copy film;

a plurality of belt rollers positioned about the exposure station, each belt roller having a belt surface;

an endless rensioning belt threaded around the rollers and in contact with the belt surfaces of the rollers, the tensioning belt pressing the master film and the copy film into initmate contact with each other and with the exposure surface;

a master take-up station at which the master film is collected after passing over the exposure surface;

a development section for developing the copy film after the copy film has been exposed;

a cooling section for cooling the developed copy film;

a copy take-up station at which the copy film is collected after passing through the cooling section; and means for driving the copy film through the exposure station, the development section and the cooling section.

In accordance with a preferred aspect of the present invention, the master film and the tensioning belt are passively driven by the drive means by virtue of contact between the copy film and each of the master film and the tensioning belt. The exposure surface is rotated by virtue of contact with the master film.

In another preferred aspect of the invention, each of the belt rollers comprises a cylinder having a surface and two circular ends, each roller being rotatable about an axis of rotation through the centers of the ends, each of the surfaces having two helical grooves formed therein, such that as the tensioning belt passes over each surface, the grooves converge or diverge as the roller rotates, i.e., the grooves tend to cause the belt to laterally expand or contract. Each of the belt rollers preferably further comprises a crown formed as a ring on the surface of the roller concentric with the axis of rotation and located between the grooves. The belt rollers are preferably arranged such that the tensioning belt contacts converging and diverging grooves alternatingly on successive surfaces of the belt rollers.

The means for driving the copy film preferably comprises a first drive means positioned between the exposure station and the development section and a second drive means positioned such that the copy film contacts the second drive means just prior to being collected at the copy take-up station.

In another preferred aspect of the invention, the cooling section comprises (1) an air knives section comprising air knife units having slots formed therein through which pressurized, filtered air is passed to contact the copy film and (2) a rotatable, cylindrical chill drum, around which the copy film passes, the chill drum having a plurality of cylindrical holes formed therethrough, through which cooling air is blown.

According to another preferred aspect of the present invention, the development section comprises a main developer chamber and means for supplying ammonia vapors to the main developer chamber, the main developer chamber having an inlet and an outlet through which the copy film passes, the main developer chamber inlet and outlet each comprising seals, the seals each comprising closely packed elongate fibers formed of a hybrid of ataprine and a neoprine which inhibit flow of ammonia vapors through the main developer chamber inlet and outlet.

In a modification in accordance with the present invention, the master film is formed as an endless loop.

In accordacne with this aspect, the master film, in a laminate with the copy film, pases through the exposure station, into a loop rack, and back through the exposure station. Accordingly, the master film is not collected at the master take-up station until the desired number of copies of the master film have been made.

The present invention is also directed to a method for copying images on a master microfiche film onto a copy microfiche film. The method comprises:

unwinding master film from a master payout station and copy film from a copy payout station by operating drive means, which engage the copy film;

bringing the master film and the copy film together to form a master film-copy film laminate;

passing the master film-copy film laminate over an exposure surface;

directing ultraviolet rays through the exposure surface and the master film to the copy film, thereby exposing the copy film;

directing an endless tensioning belt around a plurality of belt rollers having belt-contacting surfaces and being positioned such that the tensioning belt presses the copy film against the master film, which is pressed against the exposure surface, thereby holding the copy film in pressing, substantially non-slipping contact with the master film and holding the master film in pressing, substantially non-slipping contact with the exposure surface such that the master film and the tensioning belt are passively driven by the drive means by virtue of contact between the copy film and each of the master film and the tensioning belt, and the exposure surfaces is roatated by virtue of contact with the master film;

collecting the master film at a master take-up station after the master film has passed over the exposure surface;

developing the exposed copy film;

cooling the developed copy film; and collecting the cooled copy film at a copy take-up station.

In a preferred aspect in accordance with the method of the present invention, the tensioning belt is laterally expanded and contracted as it passes around the belt rollers, which have helical grooves formed in the belt-contacting surfaces thereof, the grooves being formed such that upon rotation of each roller while in contact with the tensioning belt, the grooves converge or diverge relative to the tensioning belt to laterally contract or expand the tensioning belt. Preferably, the tensioning belt is laterally contracted and expanded alternatingly by contacting belt roller surfaces having grooves which converge and diverge on successive rollers.

DETAILED DESCRIPTION OF THE PREFERRED EMBODIMENTS

Figure 1:
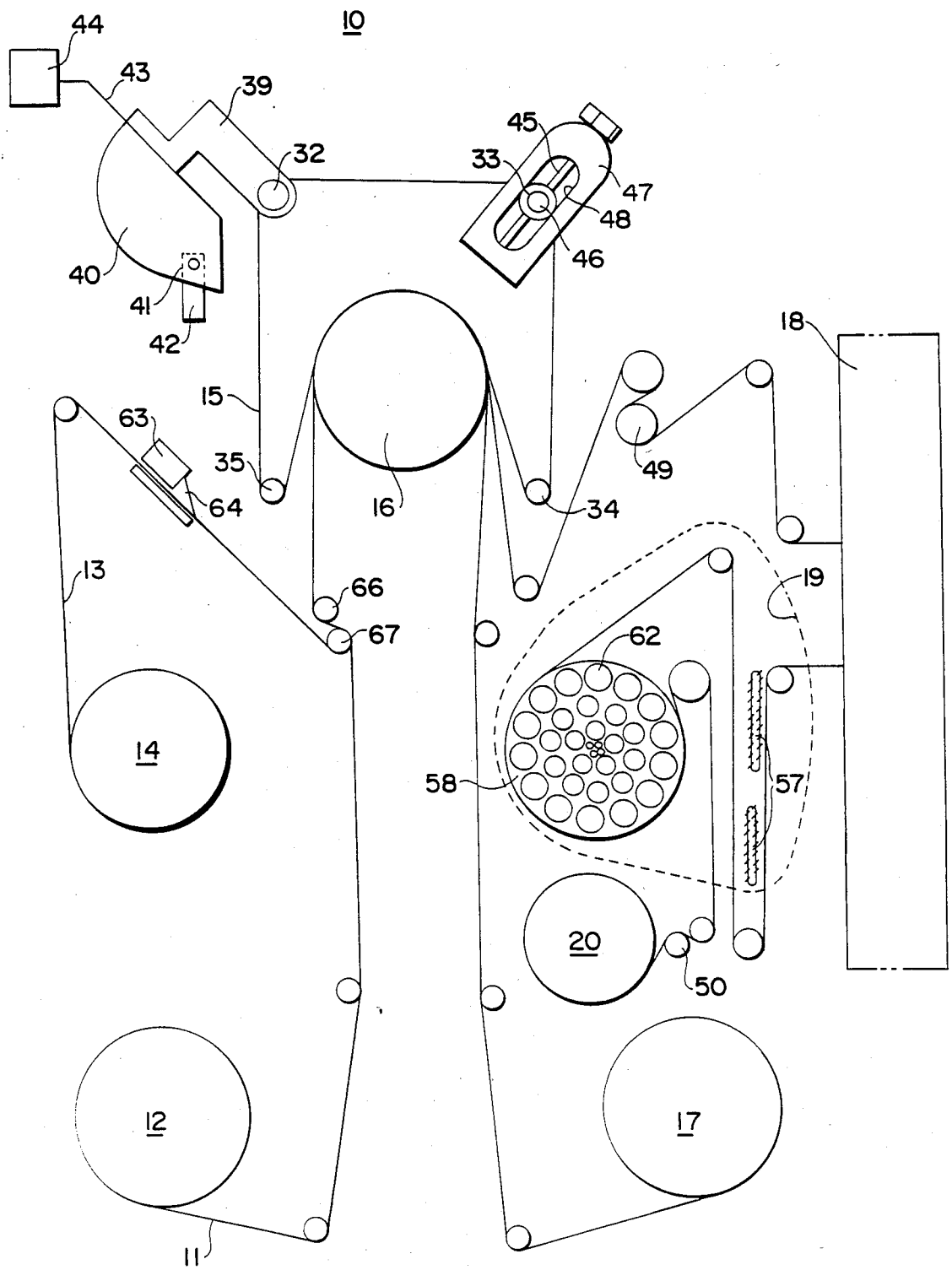
FIG. 1 is a front view of a device for copying microfiche in accordance with the present invention.

An embodiment in accordance with the present invention is shown in FIG. 1. A copier block 10 supports many of the components which make up the microfiche copier. The device generally operates as follows: Master film 11 is unwound from a master payout station 12 and copy film 13 is unwound from a copy payout station 14. The master film 11 and the copy film 13 are formed into a master film-copy film laminate as they travel around rollers 66 and 67. The master film 11 and the copy film 13 are pressed into intimate contact by a tensioning belt 15 as they pass through an exposure station 16. After passing through the exposure station 16, the master film 11 is collected at a master take-up station 17, while the copy film 13 is passed through a development section 18 and then a cooling section 19, after which it is collected at a copy take-up station 20.

A main power switch for the device is preferably provided (not shown). When the main switch is in the "off" position, the microfiche copier is in the "shut down" mode. When the main switch is in the "on" position the microfiche copier is in the "operation" mode unless the copier has been switched into the "pause" mode. In the "pause" mode, the copying device remains ready to operate, i.e., when the machine is switched from the "pause" mode to the "operation" mode, less time is required for the machine to warm up (i.e., prepare to copy) than when it is switched from the "shut down" mode to the "operation" mode. Thus, the copier is manually and/or automatically switchable among three modes, the "shut down" mode, the "operation" mode and the "pause" mode. The conditions which obtain when the copier is in each of the three modes will become apparent with the discussion which follows.

Drive means are provided for driving the master film 11 from the master payout station 12 to the master take-up station 17 and the copy film 13 from the copy payout station 14 to the copy take-up station 20. In accordance with one aspect of the present invention, the drive means drives the copy film 13, while the master film 11 is passively driven by virtue of contact with the copy film 13.

As noted above, the master film 11 is unwound from the master payout station 12. A variety of structures are suitable for use as the master payout station 12. In the embodiment shown in FIG. 1, the master payout station 12 comprises a spool mounted on a spindle which is rotatably mounted on the copier block 10. The master payout station 12 is preferably capable of accommodating up to 2,000 feet of diazo film having a thickness of 4 mil, 1,500 feet of diazo film having a thickness of 5 mil, 1,500 feet of silver master film having a thickness of 5 mil or 1,000 feet of silver master film having a thickness of 7 mil.

Non-driving tension (i.e., tension for avoiding slack rather than for driving film through the copier) is applied to the master payout station 12 in a direction opposite to the direction of travel of the master film 11 when the copier is in the "operation" mode by applying torque to the master payout station 12. In the embodiment shown in FIG. 1, the torque is applied in a clockwise direction. The tension is applied to the master film 11 to prevent or reduce slack in the master film. Greater tension may be applied if desired. In general, any suitable measn for applying torque, such as a motor, may be used to apply the torque to the master payout station 12. For example, a bow torque motor, Model 40T, manufactured and sold by Manager Engineering of Bethany, CT is suitable. Preferably, the torque applied may be readily adjusted, for example, by providing switching means to vary the voltage applied to the motor. The motor attached to the master payout station 12 is preferably also suitable for rapidly rewinding the master film 11 from the master take-up station 17 to the master payout station 12.

The copy film is unwound from the copy payout station 14. In the embodiment shown in FIG. 1, the copy payout station 14 which is a spool mounted on a spindle which is rotatably attached to the copier block 10. The copy payout station 14 is preferably suitable for accommodating up to 2,000 feet of diazo film having a thickness of 4 mil or 1,500 feet of diazo film having a thickness of 5 mil. The master film 11 and the copy film 13 may be of different thicknesses. Non-driving torque is preferably applied to the copy payout station 14 (in a manner similar to the way in which torque is applied to the master payout station 12) when the copier is in the "operation" mode to reduce or prevent slack in the copy film 13. The motor for applying torque to the copy payout station 14 is preferably also linked to a variable voltage power source so that the torque applied can be appropriately adjusted.

The master film 11 and the copy film 13 are formed into a master film-copy film laminate as they travel around rollers 66 and 67. Then the master film-copy film laminate passes into the exposure station 16.

Figure 2:
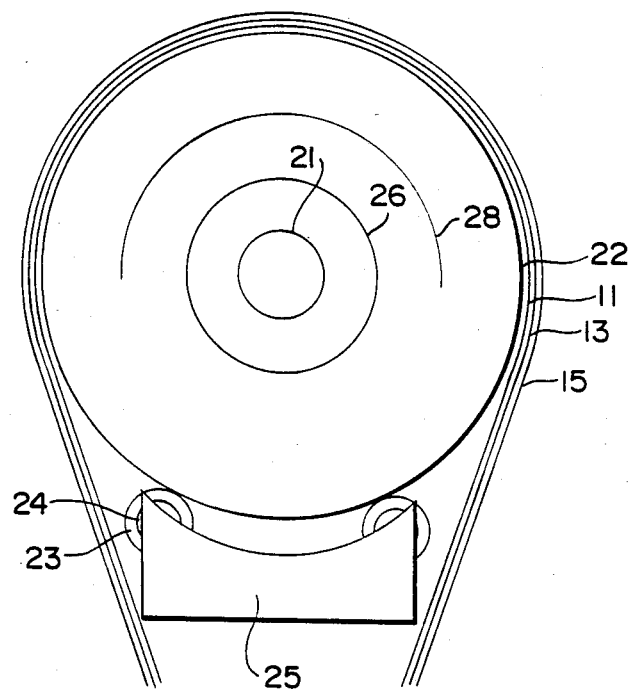
FIG. 2 is an end view of the exposure station of the embodiment shown in FIG. 1.
Figure 3:
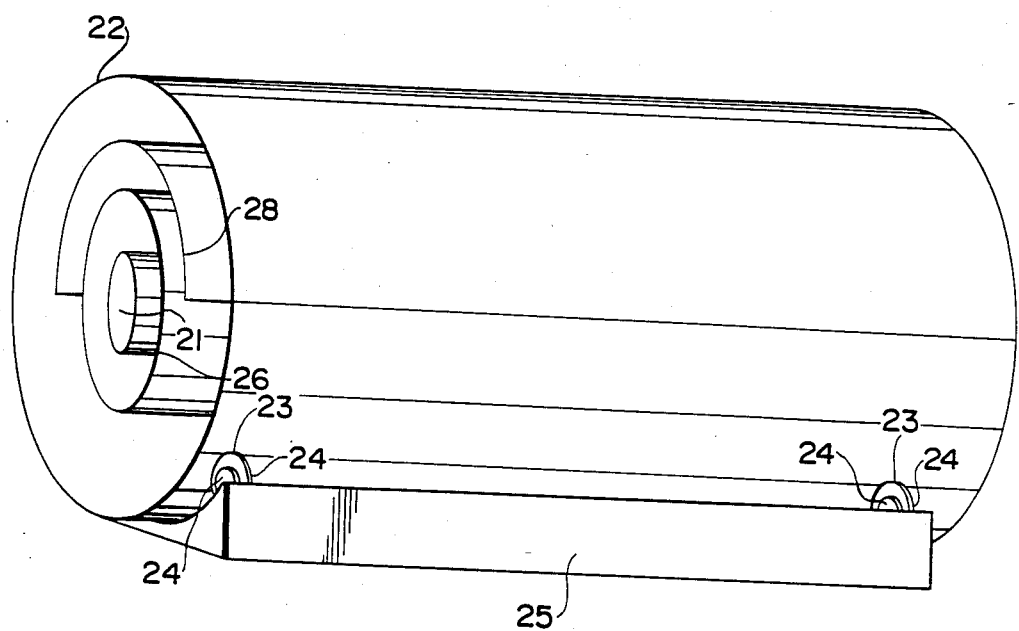
FIG. 3 is a perspective view of the exposure station of the embodiment shown in FIG. 1.

As is well known in the art of microfiche copying, diazo film is exposed by being subjected to ultraviolet radiation. In the embodiment shown in FIG. 2, an ultraviolet ray source 21, such as an ultraviolet lamp, is provided inside an exposure surface 22, through which ultraviolet light can pass. The exposure surface 22 is preferably, as shown in FIGS. 2 and 3, in the shape of a hollow cylinder and is preferably formed of glass, most preferably optical quality ground polished pyrex. The exposure surface 22 is supported by and is rotatable upon four rings 23 positioned in pairs adjacent the ends of the exposure surface 22. FIG. 2 illustrate one pair of rings 23 at one end of the exposure surface 22, while FIG. 3 illustrates one ring from each pair of rings. The rings 23 are preferably formed of Delrin. Positioned on opposite sides of each of the rings 23 are bearings 24, relative to which the rings 23 can rotate. The bearings 24 are mounted on a bearings support 25 which is rigidly attached to the copier block 10.

As shown in FIG. 2, the master film 11 and the copy film 13 pass over the exposure surface 22 on the side opposite the ultraviolet ray source 21, with the master film 11 in contact with the exposure surface 22 and the copy film 13 overlying the master film 11. The master film 11 and the copy film 13 are pressed into intimate contact with each other and with the exposure surface 22 by the tensioning belt 15 so that there is substantially no slippage between the exposure surface 22, the master film 11, the copy film 13 and the tensioning belt 15. To expose the copy film 13, ultraviolet light from the ultraviolet ray source 21 passes through the exposure surface 22 and through the master film 11 to the copy film 13. The degree of exposure, which depends, inter alia, on the intensity of ultraviolet light and the length of time that the master film 11 and the copy film 13 are subjected to the ultraviolet radiation, affects the quality of the images recorded on the copy film 13.

Figure 4:
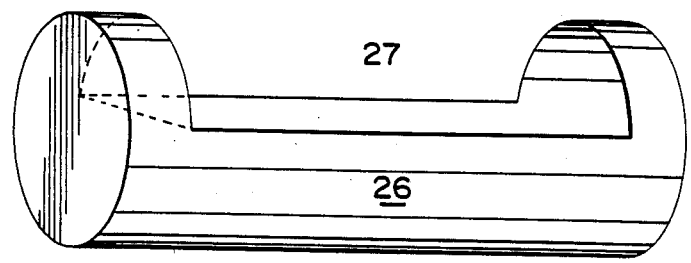
FIG. 4 is a perspective view of the shutter of the embodiment shown in FIG. 1.
Figure 5:
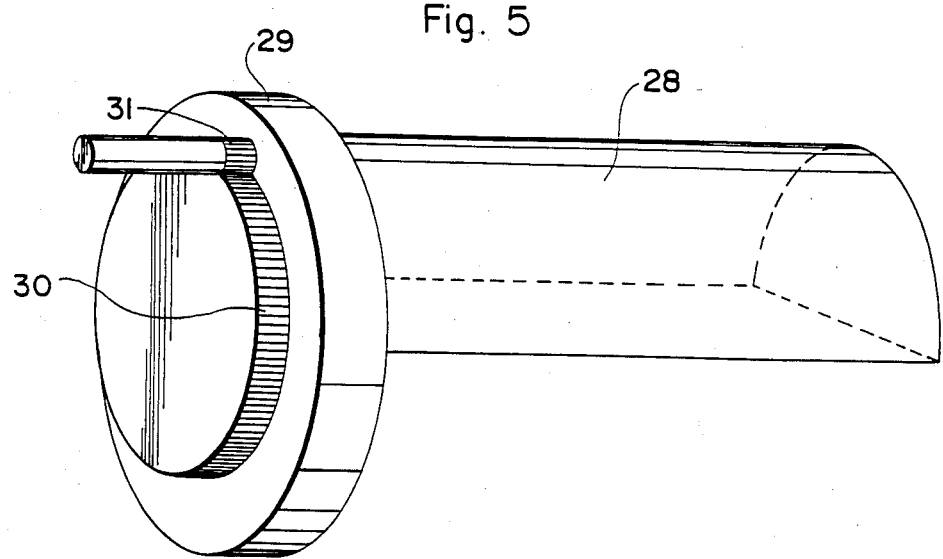
FIG. 5 is a perspective view of the cover piece of the embodiment shown in FIG. 1.
Figure 6:
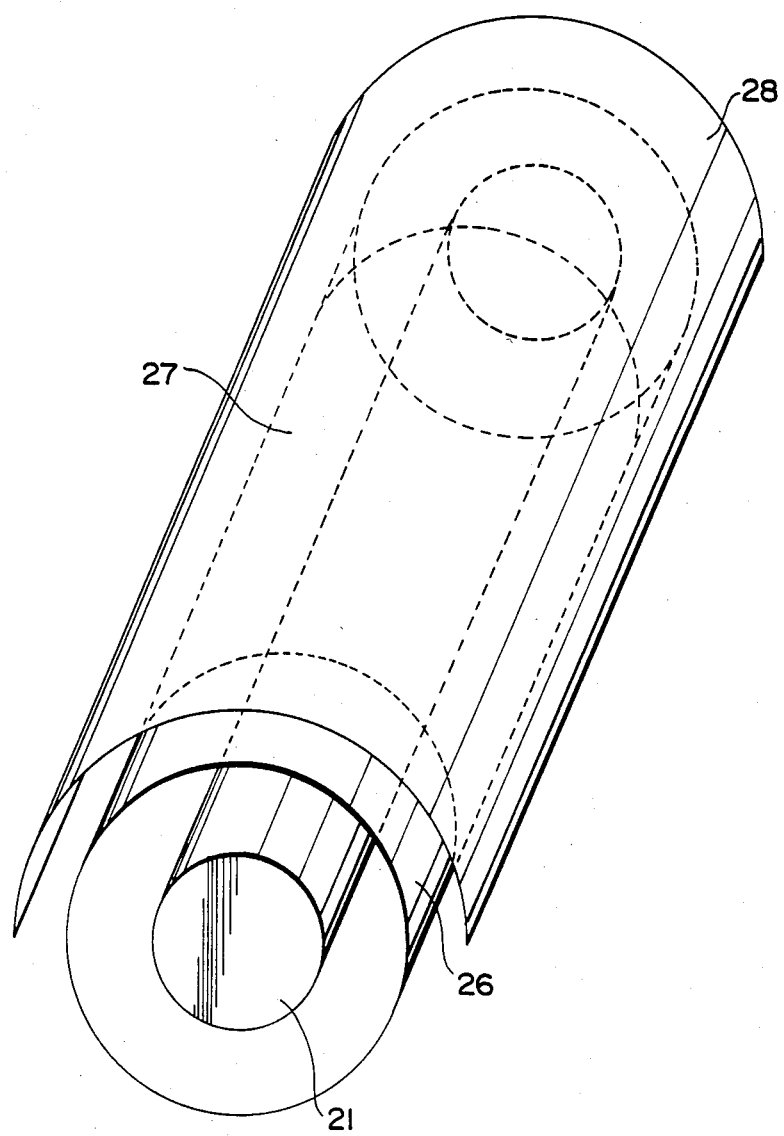
FIG. 6 is a perspective view of the ultraviolet ray source, the shutter and the cover piece of the embodiment shown in FIG. 1.

A shutter 26 (see FIGS. 3 and 4) formed of a material through which ultraviolet rays cannot pass is positioned around and is substantially coaxial relative to the ultraviolet ray source 21. The shutter 26 is shaped so as define a shutter window 27 through which ultraviolet rays can pass. Referring to FIG. 4, the shutter 26 is preferably a hollow cylindrical article having a hemi-cylindrical window 27 cut therefrom. The shape of the window 27 and the intensity of the ultraviolet ray source 21 are selected such that, based on the speed at which the master film 11 and the copy film 13 travel around the exposure surface 22, approriate exposure of the particular type or types of films being processed can be obtained. A cover piece 28 (see FIGS. 3 and 5) is provided to selectively block the ultraviolet radiation passing through the shutter window 27. In the embodiment shown in FIG. 6, the cover piece 28 has a cylindrical axis in common with that of the ultraviolet ray source 21 and the shutter 26. The cover piece 28 is positioned outside of the shutter 26, inside the exposure surface 22. The cover piece 28 comprises a hemi-cylindrical structure which is rotatable about the axis of the ultraviolet ray source 21 and through which ultraviolet radiation cannot pass. In FIG. 6, the cover piece 28 is positioned so as to completely block the ultraviolet radiation emanating from the ultraviolet ray source 21. That is, the ultraviolet radiation which would otherwise pass through the shutter window 27 is eclipsed by the cover piece 28. It is preferable that a proper degree of exposure is maintained when the cover 28 is completely open, i.e., when the cover 28 is rotated 180° from the orientatio shown in FIG. 6 to the fully open position. Alternatively, the degree of exposure can be varied corresponding to the characteristics of the master film and the copy film and the photographic speed of the copy film by appropriate adjustment of the orientation of the cover 28 relative to the shutter 26. The exposure surface 22 is outside of the cover 28 and is substantially coaxial with the ultraviolet ray source 22.

When the copier is in the "operation" mode the ultraviolet ray source 21 produces ultraviolet radiation, which passes through the shutter window 27, the exposure surface 22, and the master film 11 to the copy film 13. In addition, when the copier is in the "operation" mode or the "pause" mode, air is preferably blown through the exposure station 16 to cool the exposure station 16. When the copier is in the "pause" or the "off" mode, the cover piece 28 is preferably oriented as shown in FIG. 6, i.e., the cover piece 28 completely blocks the shutter window 27. Thus, when the copier is in the "pause" mode, ultraviolet radiation still emanates from the ultraviolet ray source 21 but is eclipsed by the cover piece 28.

In a preferred aspect in accordance with the present invention, a drive mechanism is provided which is adapted to automatically rotate the cover piece 28. The drive mechanism comprises a gear 30 rigidly attached to the cover rotator 29. The gear 30 meshes with a drive gear 31. The drive gear 31 is driven by appropriate drive means, such as a gear motor (not shown). The gear motor is preferably activated when the microfiche copier main switch is turned to the "on" position ("operation" mode) and to cause the cover 28 to rotate to the fully open position (or to the extent desired), thereby allowing ultraviolet radiation to pass through the window 27. The gear motor is again activated when the main switch is turned to the "off" position ("shut down" mode) or when the machine is switched to the "pause" mode to rotate the cover 28 to the position shown in FIG. 6, i.e., the eclipse orientation. Alternatively or additionally, the cover piece 28 may be rigidly attached to a cover rotater 29 (see FIG. 5) to facilitate manual rotation of the cover piece 28. It is preferably that the cover rotater 29 be positioned such that it can be easily accessed by an operator for manual rotation.

In a modification in accordance with the present invention, when the copier is switched from the "shut down" mode or the "pause" mode to the "operation" mode, the drive gear 31 is activated to rotate the cover 28 to an extent such that the opening through the shutter window 27 and the cover 28 corresponds to the characteristics of the master film 11 and the copy film 13.

As discussed above, the tensioning belt 15 ensures that the master film 11 and the copy film 13 are in intimate contact with each other and with the exposure surface 22 as they pass over the exposure surface 22. The belt 15 may be formed of any suitable low-stretch, heat resistant material. Preferably, the belt 15 is about 4 inches wide and is formed of endlessly woven polyester having a neoprine or ataprine coating. The belt may be formed of other materials, for example, Kevlar ®, manufactured and sold by duPont de Nemours. In the embodiment shown in FIG. 1, the belt 15 is mounted on four rollers 32, 33, 34 and 35 positioned around the exposure surface. Referring to FIG. 7, the roller 32 preferably has two helical grooves 36 formed in the surface 37 which contacts the belt 15. The grooves 36 are preferably approximately 1/16 inch deep and ⅛ inch wide, spaced such that there are about 4 grooves per inch. The roller 32 also has a crown 38, preferably extending about 1/2500 inch from the surface 37 of the roller 32.

Figure 7A:
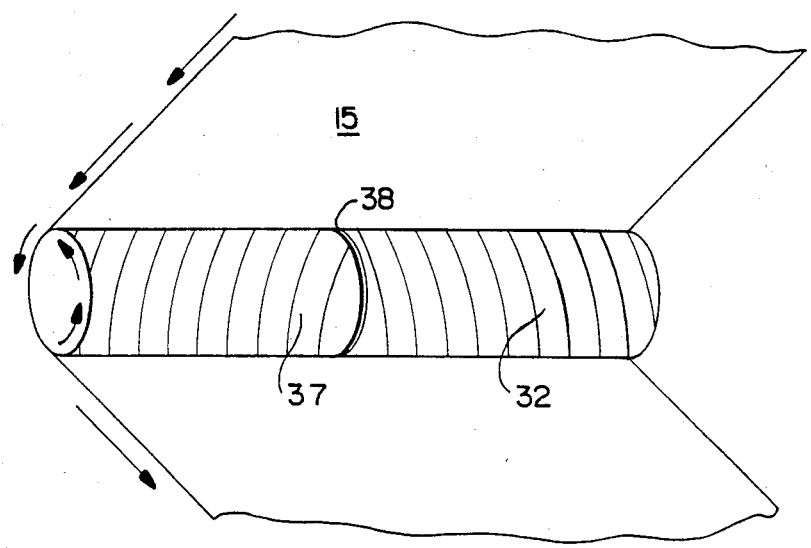
FIG. 7a is a perspective view of a belt roller of the embodiment shown in FIG. 1.
Figure 7B:
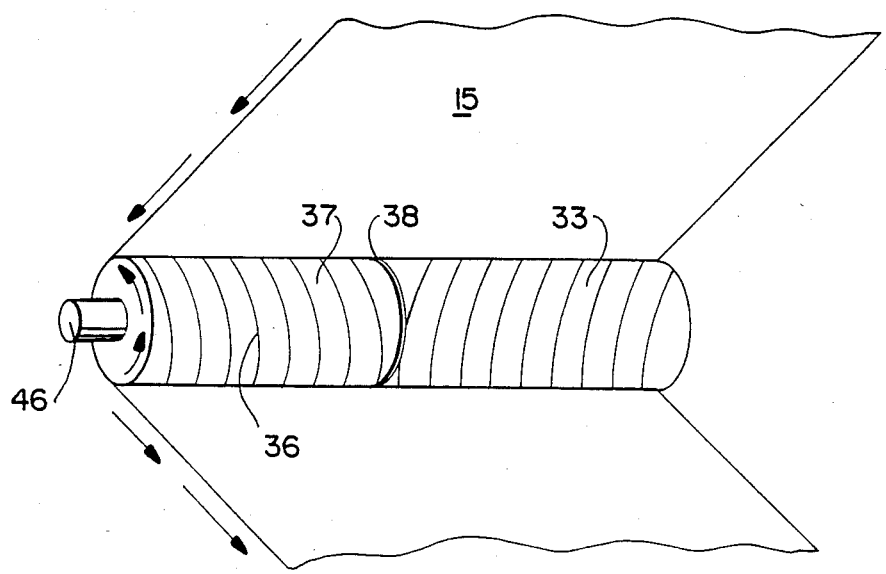
FIG. 7b is a perspective view of a roller which includes an extension portion.

The rollers 33, 34 and 35 are preferably similar to the roller 32. That is, each of the rollers 32–35 has helical grooves 36 and a crown 38 to provide positive control, whereby alignment of the master film 11 and the copy film 13 is ensured. Referring to FIG. 1, the rollers 32–35 rotate counter-clockwise as the belt passes clockwise around the exposure cylinder 22. The grooves 36 are formed in the surfaces 36 of the rollers 32–35, preferably such that as the tensioning belt 15 passes over each surface 37, the grooves converge or diverge as the roller rotates, i.e., the grooves tend to cause the belt to laterally expand or contract. In FIG. 7a, the grooves 36 converge as the belt 15 passes over the surface 37, while in FIG. 7b, the grooves 36 diverge relative to the belt 15. In a preferred aspect in accordance with the present invention, the rollers 32–35 are positioned such that the belt 15 contacts converging and diverging grooves alternatingly on successive surfaces 37 of the rollers 32–35. For example, the rollers 32–35 are preferably arranged such that the grooves 36 on rollers 33 and 35 diverge while the grooves 36 on rollers 32 and 34 converge. By providing alternating converging and diverging helical grooves, the belt is alternatingly drawn in laterally and drawn out laterally, thereby flattening the belt and maintaining accurate control of the belt relative to the crowns 38 on the respective rollers 32–35.

The tension on the belt 15, and therefore the force applied to the master film 11 and the copy film 13 are preferably variable. In the embodiment shown in FIG. 1, the roller 32 is movable so that the tension applied to the belt 15 may be adjusted. More particularly, the roller 32 is rotatably mounted on a roller support 39 which is rigidly attached to a support bracket 40. Rollers 33–35 are rotatably mounted on the copier block 10. The support bracket 40 is pivotable about a pivot pin 41 which is supported by pivot support 42 rigidly attached to the copier block 10. A tension member 43 is attached to the roller support 39 and to a tensioning station 44. The tensioning station 44 includes a spring loaded tensioning device which applied force to the tension member 43. When the force applied to the tension member 43 is increased, the support bracket 40 rotates counter-clockwise about the pivot pin 41, moving the roller 32 away from the exposure surface 22 such that the total distance around the rollers 32–35 is increased, thereby increasing the tension on the belt 15 and increasing the downward force applied to the copy film 13 and the master film 11 toward the exposure surface 22. When the force applied to the tension member 43 is decreased, the support bracket 40 pivots clockwise and the tension on the belt 15 is decreased. The force applied to the tension member 43 preferably can be manually adjusted.

The front end of roller 33, as viewed from the perspective shown in FIG. 1, preferably may be raised or lowered to provide positive tracking of the belt 15. In the embodiment shown in FIG. 1, an adjusting screw 45 is threaded through an extension portion 46 (see FIG. 7b) attached to the front end of the roller 33. The adjusting screw 45 is rotatably supported by a screw support 47 which is rigidly attached to the copier block 10. The rear end of the roller 33 is pivotably (as well as rotationally) mounted on the copier block 10 such that the front end of the roller 33 can move within an opening 48 in the screw support 47. Alternatively, the adjusting screw 45 may be threaded in the screw support 47 and rotationally supported by the extension portion 46, and include a pin which fits in a groove in the extension portion, such that axial movement of the adjusting screw 45 upon rotation thereof cuases movement of the extension portion 46 within the opening 48. By providing for adjustment of the roller 33, it is possible to manually adjust the tracking of the belt 15 so that the belt 15 rides substantially centered on the surfaces 37 of the rollers 32–35. In addition, the tension across the width of the belt is thereby balanced, ensuring that constant tension is applied to the copy film 11 and the master film 13 as they pass through the exposure station 16.

The master film passes from the exposure station 16 to the master take-up station 17. In the embodiment shown in FIG. 1, the master take-up station 17, at which the master film 11 is collected, comprises a spool mounted on a spindle which is rotatably mounted on the copier block 10. As with the master payout station 12 and the copy payout station 14, non-driving torque is preferably applied to the master take-up station 17 when the copier is in the "operation" mode. The torque is applied so as to provide tension to the master film 11 in the direction of travel of the master film 11, to minimize or prevent slack in the master film 11. That is, in the embodiment shown in FIG. 1, torque is applied to the master take-up station 17 in a counter-clockwise direction. As with the master payout station 12 and the copy payout station 14, non-driving torque may be applied to the master take-up station 17 by means of a motor, such as a bow torque motor. The motor is preferably linked to a variable voltage power source so that the torque applied to the master take-up station 17 can be varied.

Figure 8:
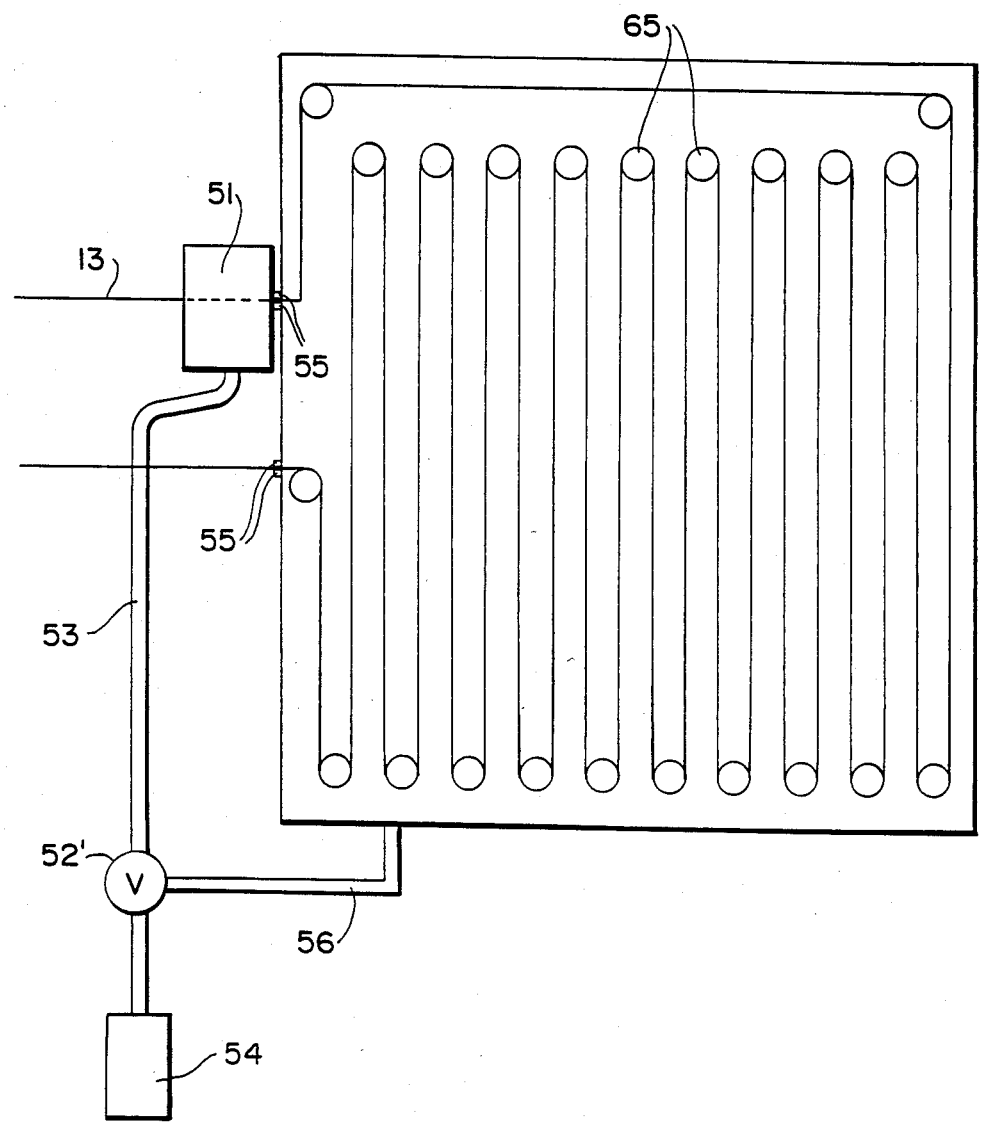
FIG. 8 is a front cutaway view of the development section of the embodiment shown in FIG. 1.

After leaving the exposure station, the copy film is directed to the development section 18. Referring to FIG. 8, the development section 18 includes a small chamber 51 positioned adjacent a main developer chamber 52. In the embodiment shown in FIG. 8, the small chamber 51 comprises a rectangular box, to which a vacuum hose 53 is attached. The vacuum hose 53 communicates with the interior of the small chamber 51 and is connected to a vacuum 54 so that vapors, particularly residual ammonia vapors, can be removed from the small chamber 51 while the copier is in the "pause" mode or the "operation" mode. The copy film 13 passes through the small chamber 51 and into the main developer chamber 52.

The copy film 13 passes through sets of seals 55 located at the points of its entry into and exit from the main developer chamber 52. The seals 55 are preferably formed of a structure having a plurality of elongate fibers packed closely together. The fibers are formed of a material which is resistant to attack by heated ammonia vapors. The fibers of the seals 55 may comprise flocked tape manufactured by M&C Industries, located in New Jersey. Opposite sides of the seals 55 are pressed together through silicone rubber backings. The seals 55 inhibit or prevent ammonia vapors from escaping the main developer chamber 52. Ammonia vapors which escape through the entry to the main developer chamber 52 are removed through the vacuum hose 53.

The copy film 13 is developed in the main developer chamber 52. As is well known in the art of diazo film, suitable conditions for development (which may vary depending on the specific film) include vaporous ammonia of from about 20 to about 26 baume concentration, preferably 22 baume concentration, and a temperature of from about 150° F. to about 180° F., to which the copy film 13 is subjected to for from about 12 to about 20 seconds. Development may either be anhydrous or aqueous. The main developer chamber 52 is a sealed chamber, the only openings being at the sealed location of entry and exit of the copy film 13. Ammonia vapors are supplied from a reservoir (not shown). Blowers (not shown) blow the ammonia vapors, which are generally heavier than ambient air, upward within the main developer chamber 52 while the copier is in the "operation" mode or the "pause" mode. Referring to FIG. 8, the copy film 13 passes around a series of development rollers 65 so that the copy film is subjected to development conditions for an adequate period of time.

A vacuum hose 56 is preferably attached to the main developer chamber 52 to enable rapid removal of the ammonia vapors in the interior of the main developer chamber 52. A three way valve 52' may be provided, alternately linking (by a manual switch) vacuum hoses 53 and 56 to the vacuum 54 such that the ammonia in the main developer chamber 52 can be removed, when desired, by the vacuum 54. Alternatively, a separate vacuum may be provided to remove ammonia from the main developer chamber 52 through the vacuum hose 56. The ability to remove ammonia rapidly, for example, in about 1 minute, from the main developer chamber 52 is desirable when the main developer chamber 52 must be opened, for example, if the copy film 13 breaks while passing through the main developer chamber 52.

Ammonia vapors withdrawn from the small chamber 51 or the main developer chamber 52 are either recirculated or prepared for disposal. A suitable disposal treatment includes passing the ammonia vapors through an acetic acid absorber solution to neutralize the ammonia vapors. Recirculation of ammonia vapors enables diminished ammonia usage.

In a preferred aspect in accordance with the present invention, an ammonia depletion detector and an ammonia depletion alarm are provided. The main developer chamber is sealed and insufficient development can otherwise only be detected by observation of the copy film 13 as it exits the main developer chamber 52. To ensure that complete development of the copy film 13 is maintained, the ammonia depletion detector activates the alarm when there is no (or very little) ammonia left in the reservoir or, alternatively, when the concentration of ammonia vapors in the main developer chamber 52 falls below a suitable level. In such a case, the ammonia depletion detector preferably also activates means for switching the copier into the "pause" mode. The copy film 13 passes from the development section 18 to the cooling section 19.

To minimize or prevent longitudinal and lateral curling in the copy film 13, the copy film 13 must be sufficiently cooled prior to being collected at the copy take-up station 20. The copy film 13 is typically at a temperature of about 150° F. when it exits the development section 18 and is preferably at a temperature of about 72° F. when it is collected at the copy take-up station 20. In the embodiment shown in FIG. 1, the cooling section 19 includes an air knives section 57 and a chill drum 58.

Figure 9:
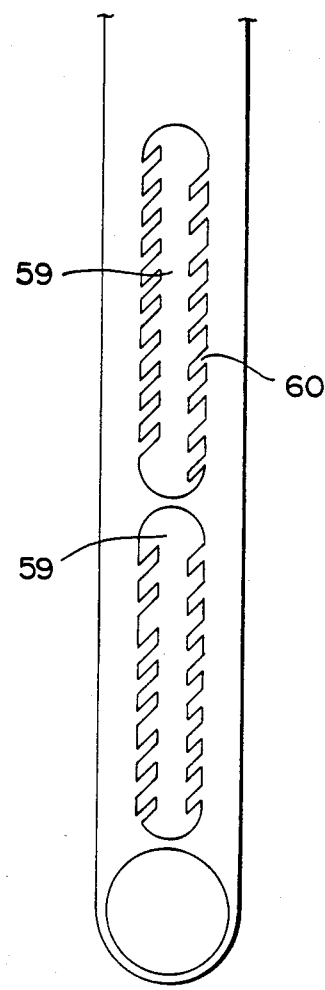
FIG. 9 is an enlarged front view of the air knives of the embodiment shown in FIG. 1.

Referring to FIG. 9, the air knives section 57 comprises air knife units 59 which have slots 60 formed therein through which is passed filtered air supplied under pressure while the copier is in the "operation" mode. The slots 60 are formed and positioned relative to the copy film 13 such that the pressurized, filtered air passing out of the slots 60 creates a knifing effect across the copy film 13, laterally shearing away heat from the surfaces of the copy film 13. In the arrangement shown in FIG. 1, the copy film 13 passes on both sides of the air knife units 59 such that both sides of the copy film 13 are exposed to air flowing out of the slots 60. The pressurized air passing out through the slots 60 preferably contacts the top and bottom of the copy film 12 at respective angles of about 45° relative to the direction of travel of the copy film 13. The copy film 13 passes through the air knives section 57 to the chill drum 58.

The copy film 13 passes around the chill drum 58 which comprises a cylindrical structure rotatably attached to the copier block 10. The chill drum 58 is preferably formed of aluminum. Cylindrical holes 62 are formed in the chill drum 58 through which air is blown by blowers (not shown) mounted on the copier block 10. The blowers preferably operate when the copier is in the "operation" mode. As shown in FIG. 1, the diameters of the holes 62 are progressively larger at greater distances from the axis of rotation of the chill drum 58 to maximize the rate of heat transfer from the copy film 13 to the surface of the chill drum 58. Referring to FIG. 1, the copy film 13 is preferably threaded around the chill drum 58 in a direction opposite to the direction in which it is threaded around the copy take-up station 20. That is, in FIG. 1, the copy film 13 travels counter-clockwise around the chill drum 58 and clockwise around the copy take-up station 20. Such an arrangement further assists in preventing longitudinal curling in the copy film 13.

By employing the air knives section 57 and the chill drum 58, as described above, it has been found possible to cool the copy film 13 from about 150° F. upon exit from the main developer chamber 52, to from about 100° F. to 105° F. after passing through the air knives section 57 and at about 70° F. after contacting the chill drum 58. The temperature of the air blown through the knife units 59 and/or that blown through the chill drum 58 can be varied. The copy film 13 can be cooled to about 72° F. after contacting the chill drum 58 even when operating at film speeds of up to 170 ft/min or greater.

The copy film 13 is collected at the copy take-up station 20. In the embodiment shown in FIG. 1, the copy take-up station 20 comprises a spool mounted on a spindle which is rotatably mounted on the copier block 10. Non-driving tension is applied to the copy film 13 in the direction of travel of the copy film 13 when the copier is in the "operation" mode to minimize or prevent slack in the copy film 13 by applying a torque to the copy take-up station 20. In the embodiment shown in FIG. 1, torque is applied in a clockwise direction. The torque may be applied to the copy take-up station 20 by a motor, such as a bow torque motor. The motor is preferably linked to a variable voltage power source so that the torque applied can be adjusted.

Thus, means are provided for applying torque to each of the master payout station 12, the copy payout station 14, the master take-up station 17 and the copy take-up station 20 to provide positive tension, i.e., the master film 11 and the copy film 13 are maintained at a predetermined tension. Each of the stations 12, 14, 17 and 20 preferably have motors for applying the torque, which motors are preferably separately linked to variable voltage power sources so that the torque applied to each station can be appropriately adjusted to obtain the predetermined tension. The motors are in operation when the copier is in the "operation" mode and are deactivated when in the "pause" or "shut down" modes.

Drive means are provided for driving the copy film 13 through the exposure station 16 and through the development section 18. In the embodiment shown in FIG. 1, drive capstans 49 and 50 apply tension to the copy film 13 in an amount sufficient to drive the copy film 13 through the exposure station 16 and the development section 18. The drive capstans 49 and 50 are rotatably mounted in the copier block 10 and preferably comprise rubber coated aluminum rollers. By virtue of the contact between the copy film 13 and the master film 11, and the copy film 13 and the belt 15, the master film 11 and the belt 15 are indirectly or passively driven by the drive capstans 49 and 50. In addition, the exposure surface 22 is rotated by virtue of contact with the master film 11. The drive capstans 49 and 50 are driven when the copier is in the "operation" mode.

In a preferred aspect in accordance with the present invention, the torques applied to the stations 12, 14, 17 and 20 are tailored using the variable voltage power sources such that the master film 11 has little or no influence on the copy film 13. That is, the copy film 13 travels through the exposure station 16 at a rate which corresponds or approximately corresponds to the rate at which it would travel, based on the torques applied to the copy payout station 14 and the copy take-up station 20, if the master film 11 were not present. Appropriate meters, such as a meter for detecting the rate at which the films are travelling, may be provided to ensure that these operating conditions are maintained.

When making multiple copies of a master film, it is convenient to arrange the master film as an endless loop. Thus, in a preferred aspect in accordance with the present invention, a loop rack (not shown) may be provided, which comprises a series of rollers, an appropriate number of which the master film 11 is threaded around, so that the master film 10 is substantially free of slack. When the loop rack is employed, the master film 11 passed from the exposure station 16 to the loop rack, through the loop rack and eventually back through the exposure station 16. Additional loop units can be provided to process endless loops of up to 300 master microfiche or more. The copier may also include an automatic loop counter which includes means for switching the copier into the "pause" mode when the programmed number of duplicates of the master film 11 have been completed.

Static charges are frequently created when handling microfiche, especially when winding or unwinding the microfiches. Moreover, slitting hairs and slitting dusts produced by splicing the film and other foreign matter are typically present and may be attracted by static charges to the microfiche. Such foreign matter has deleterious effects on the copying process, particularly when it enters the exposure station 16. In a preferred aspect in accordance with the present invention, means for cleaning the master film 11 and the copy film 13 prior to their entry into the exposure station 16 are provided. Suitable cleaning means include static eliminators and brushes. Such brushes are preferably provided with beater bars for removing debris from the brushes. Debris thus removed is preferably withdrawn by means of a vacuum system. The brushes are preferably rotated so that the bristles thereof move in a direction opposite to the direction of movement of the copy film 13.

In another preferred aspect in accordance with the present invention, a copy film out station 63 is provided. The copy film out station 63 operates to switch the copier of the "pause" mode when the end of the copy film 13 passes, i.e., when the copy film runs out or possibly when it has broken. In the embodiment shown in FIG. 1, as the copy film 13 passes through the copy film out station 63, the copy film 13 supports a contact element 64 which is connected to the copy film out station 63. When the end of the copy film 13 passes through the copy film out station 63, such that the contact element 64 is no longer supported by the copy film 13, the contact element 64 falls and trips a microswitch which causes the copier to be switched to the "pause" mode.

The copiers in accordance with the present invention are capable of processing 105 mm film at film speeds of up to 170 feet/minute, i.e., 20,000 fiche/hour.

Although the microfiche copier of the present invention has been described in connection with the preferred embodiment thereof, it will be appreciated by those skilled in the art that additions, modifications, substitutions and deletions not specifically described may be made without departing from the spirit and scope of the invention defined in the appended claims.

What is claimed is:

1. A device for copying images on a master microfiche flim onto a copy microfiche film comprising:
   a master payout station from which master film is supplied;
   a copy payout station from which copy film is supplied to form a master film-copy laminate;

an exposure station comprising an ultraviolet ray source positioned within a rotatable exposure surface over which said master film-copy film laminate is passed such that ultraviolet light from said ultraviolet ray source passes through said exposure surface and said master film and then exposes said copy film;

a plurality of belt rollers positioned above said exposure station, each of said belt rollers having a belt surface;

an endless tensioning belt threaded about said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a master take-up station at which said master film is collected after said master film has passed over said exposure surface;

a development section for developing said copy film after said copy film has been exposed;

a cooling section for cooling the developed copy film;

a copy take-up station at which said copy film is collected after said copy film has passed through said cooling section; and drive means for driving said copy film through said exposure station and through said development section, said master film and said tensioning belt being passively driven by said drive means by virtue of contact between said copy film and each of said master film and said tensioning belt, said exposure surface being rotated by virture of contact with said master film.

2. The copying device of claim 1 wherein each of said master payout station, said copy payout station, said master take-up station and said copy take-up station comprises means for applying non-driving torque to maintain tension on said master film and said copy film without significantly affecting the rate of travel of said copy film.

3. The copying device of claim 2 wherein each of said torque-applying means comprises a motor and means for varying the voltage applied to said motor.

4. The copying device of claim 1 wherein each of said plurality of belt rollers comprises a cylinder having said belt surface and two circular ends, each roller being rotatable about an axis of rotation through the centers of said ends, each of said surfaces having two helical grooves formed therein such that upon rotation of each roller while in contact with said tensioning belt, said grooves converge or diverge relative to said tensioning belt, each of said rollers further comprising a crown formed as a ring on said each surface concentric with said axis of rotation and positioned between said grooves.

5. The copying device of claim 1 wherein said exposure station comprises an ultraviolet ray source, a shutter having a window formed therein, a cover piece and an exposure surface, said cover piece being rotatable to adjust the area through which ultraviolet light can pass through said window.

6. The copying device of claim 5 wherein said exposure surface comprises a glass cylinder mounted on rotatable rings.

7. The copying machine of claim 6, further comprising switching means for manually switching the copying machine to an operation mode or to a shut down mode.

8. The copying machine of claim 7, further comprising means for automatically and/or manually switching the copying machine to a pause mode.

9. The copying machine of claim 8, further comprising means for rotating said cover piece to an eclipse position, relative to said window, when said copying machine is switched to said shut down mode or said pause mode.

10. The copying maching of claim 9, further comprising means for rotating said cover piece to an open position, relative to said window, when said copying machine is switched to said operation mode.

11. The copying machine of claim 10, wherein said open position is a fully open position.

12. The copying device of claim 1, further comprising means for cleaning said master film and said copy film before said films enter said exposure station, said cleaning means comprising a static eliminator and a rotatable brush provided with a beater bar adapted to remove debris from said brush, said brush having bristles and being rotated so that the bristles move in a direction opposite to the direction of movement of said films.

13. The copying device of claim 8, further comprising a copy film out station comprising a switch and a pivotable contact element, the contact element being restrained from movement by said copy film as said copy film passes said contact element such that when the end of the copy film passes, said contact element actuates said switch, causing the copying machine to switch to said pause mode.

14. The device of claim 1 wherein said drive means comprises a first device means positioned between said exposure station and said development section, and a second drive means positioned such that said copy film contacts said second drive means just prior to being collected at said copy take-up station.

15. The device of claim 1 wherein said cooling section comprises an air knives section comprising air knife units having slots formed therein through which pressurized, filtered air is passed to contact said copy film; and a rotatable, cylindrical chill drum, around which said copy film passes, said chill drum having a plurality of cylindrical holes formed therethrough, through which cooling air is blown.

16. A device for copying images on a master microfiche film onto a copy microfiche film comprising:

a master payout station from which master film is supplied;

a copy payout station from which master film is supplied to form a master film-copy film laminate;

an exposure station comprising an ultraviolet ray source positioned within a rotatable exposure surface over which said master film-copy film laminate is passed such that ultraviolet light from said ultraviolet ray source passes through said exposure surface and said master film and then exposes said copy film;

a plurality of belt rollers positioned about said exposure station, each of said belt rollers having a belt surface;

an endless tensioning belt threaded around said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a master take-up station at which said master film is collected after said master film has passed over said exposure surface;

a development section for developing said copy film after said copy film has been exposed;

a cooling section for cooling the developed copy film;

a copy take-up station at which said copy film is collected after said copy film has passed through said cooling section; and first and second drive means for driving said copy film through said exposure station and through said development section, said first drive means being positioned between said exposure station and said development section, said second drive means being positioned such that said copy film contacts said second drive means just prior to being collected at said copy take-up station, said master film and said tensioning belt being passively driven by said drive means by virtue of contact between said copy film and each of said master film and said tensioning belt, said exposure surface being rotated by virtue of contact with said master film.

17. A device for copying images on a master microfiche film onto a copy microfiche film comprising:

a master payout station from which master film is supplied;

a copy payout station from which copy film is supplied to form a master film–copy film laminate;

an exposure station comprising an ultraviolet ray source positioned within a rotatable exposure surface over which said master film–copy film laminate is passed such that ultraviolet light from said ultraviolet ray source passes through said exposure surface and said master film and then exposes said copy film;

a plurality of belt rollers positioned about said exposure station, each of said belt rollers having a belt surface;

an endless tensioning belt threaded around said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a master take-up station at which said master film is collected after said master film has passed over said exposure surface;

a development section for developing said copy film after said copy film has been exposed;

a cooling section for cooling the developed copy film;

a copy take-up station at which said copy film is collected after said copy film has passed through said cooling section; and drive means for driving said copy film through said exposure station and through said development section;

each of said belt rollers comprising a cylinder having a surface and two circular ends, each roller being rotatable about an axis of rotation through the centers of said ends, each of said surfaces having two helical grooves formed therein such that upon rotation of each roller while in contact with said tensioning belt, said grooves converge or diverge relative to said tensioning belt.

18. The copying device of claim 17, each of said belt rollers further comprising a crown formed as a ring on said belt surface and positioned between said grooves.

19. The copying device of claim 18, wherein each of said crowns is substantiallyh in the center of each of said surfaces.

20. The copying device of claim 17 wherein said plurality of belt rollers comprise first, second, third and fourth rollers.

21. The copying device of claim 17 wherein the belt rollers are positioned such that said tensioning belt contacts converging and diverging grooves alternatingly on successive surfaces of said belt rollers.

22. The copying device of claim 17 wherein one of said rollers is mounted such that one end thereof can be moved to vary the axis of rotation of said one roller to adjust the tracking of said tensioning belt around said rollers.

23. The copying device of claim 17, further comprising a roller support which is pivotable about a pivot pin, said roller support being attached to a tension member and rotatably supporting one of said rollers, such that by varying the tension applied to said tension member, said roller support pivots relative to said pivot pin, thereby varying the distance around said rollers to adjust the tension of said tensioning belt and the force applied by said tensioning belt to said copy film and said master film toward said exposure surface.

24. The copying device of claim 17 wherein one of said rollers is movable to adjust the tension of said tensioning belt.

25. The copying device of claim 17, further comprising an adjusting screw threaded through an extension portion attached to one of said ends of one of said rollers, and a screw support having an opening formed therein, said adjusting screw being rotatably supported in said screw support opening, such that said extension portion can be moved to vary the axis of rotation of said one roller, so that the tracking of said tensioning belt can be adjusted.

26. The device of claim 17 wherein said drive means comprises a first drive means positioned between said exposure station and said development section, and a second drive means positioned such that said copy film contacts said second drive means just prior to being collected at said copy take-up station, said master film and said tensioning belt being passively driven by said drive means by virtue of contact between said copy film and each of said master film and said tensioning belt, said exposure surface being rotated by virtue of contact with said master film.

27. A device for copying images on a master microfiche film onto a copy microfiche film comprising:

a master payout station from which master film is supplied;

a copy payout station from which copy film is supplied to form a master film–copy film laminate;

an exposure station comprising an ultraviolet ray source positioned within a rotatable exposure surface over which said master film–copy film laminate is passed such that ultraviolet light from said ultraviolet ray source passes through said exposure surface and said master film and then exposes said copy film;

a plurality of belt rollers positioned about said exposure station, each of said belt rollers having a belt surface;

an endless tensioning belt threaded around said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a master take-up station at which said master film is collected after said master film has passed over said exposure surface;

a development section for developing said copy film after said copy film has been exposed;

a cooling section for cooling the developed copy film, said cooling section comprising an air knives section comprising air knife units having slots formed therein through which pressurized, filtered air is passed to contact said copy film and a rotatable, cylindrical drum, around which said copy film passes, said chill drum having a plurality of cylindrical holes formed therethrough, through which cooling air is blown;

a copy take-up station at which said copy film is collected after said copy film has passed through said cooling section; and drive means for driving said copy film through said exposure station and through said development section.

28. The copying device of claim 27 wherein one of said chill drum and said copy take-up station is rotated clockwise and the other is rotated counter-clockwise.

29. The copying device of claim 27 wherein said slots are formed in said air knife units such that said pressurized air contacts said copy film on both sides thereof at an angle of about 45° relative to the direction of travel of said copy film, said copy film passing on both sides of said air knife units.

30. The copying device of claim 27 wherein said holes are of larger diameter at greater distances from the axis of rotation of said chill drum.

31. The copying device of claim 27, wherein said chill drum is formed of aluminum.

32. A device for copying images on a master microfiche film onto a copy microfiche film comprising:

a master payout station from which master film is supplied;

a copy payout station from which copy film is supplied to form a master film-copy film laminate;

an exposure station comprising an ultraviolet ray source positioned within a rotatable exposure surface over which said master film copy film laminate is passed such that ultraviolet light from said ultraviolet ray source passes through said exposure surface and said master film and then exposes said copy film;

a plurality of belt rollers positioned about said exposure station, each of said belt rollers having a belt surface;

an endless tensioning belt threaded around said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a master take-up station at which said master film is collected after said master film has passed over said exposure surface;

a development section for developing said copy film after said copy film has been exposed, said development section comprising a main developer chamber and means for supplying ammonia vapors to said main developer chamber, said main developer chamber having an inlet and an outlet through which said copy film passes, said main developer chamber inlet and outlet each comprising seals, said seals each comprising closely packed elongate polyester fibers which inhibit flow of ammonia vapors through said main developer chamber inlet and outlet;

a cooling section for cooling the developed copyfilm;

a copy take-up station at which said copy film is collected from said copy film has passed through said cooling section; and drive means for driving said copy film through said exposure station and through said development section.

33. The copying device of claim 32 wherein said seals are pressed together through silicone rubber backings.

34. The copying device of claim 32, further comprising an ammonia depletion detector, an ammonia depletion alarm, and an ammonia supply vessel, said detector being adapted to actuate said alarm when said ammonia supply vessel is substantially empty.

35. The copying device of claim 32, said development section further comprising a small chamber having an inlet and an outlet, through which said copy film passes immediately prior to entering said main developer chamber.

36. The copying device of claim 35, further comprising means for selectively removing ammonia vapors from said small chamber and said main developer chamber.

37. A device for copying images on a master microfiche film onto a copy microfiche film comprising:

means for guiding an endless master film through an exposure station and through a loop rack;

a copy payout station from which copy film is supplied, said copy film forming a master film-copy film laminate with said master film;

an exposure station comprising an ultraviolet ray source positioned within a rotatable exposure surface over which said master film-copy film laminate is passed such that ultraviolet light from said ultraviolet ray source passes through said exposure surface and said master film and then exposes said copy film;

a plurality of belt rollers positioned about said exposure station, each of said belt rollers having a belt surface;

an endless tensioning belt threaded around said rollers and in contact with said belt surfaces of said rollers, said tensioning belt pressing said master film and said copy film into intimate contact with each other and with said exposure surface, such that there is substantially no slippage between said exposure surface, said master film, said copy film and said tensioning belt;

a development section for developing said copy film after said copy film has been exposed;

a cooling system for cooling the developed copy film;

a copy take-up station at which said copy film is collected after said copy film has passed through said cooling section; and drive means for driving said copy film through said exposure station and through said development section, said master film and said tensioning belt being passively driven by said drive means by virtue of contact between said copy film and each of said master film and said tensioning belt, said exposure surface being rotated by virtue of contact with said master film.

38. The copying device of claim 37, further comprising a loop counter which comprises means for switching the copying device into said pause mode when a porogrammed number of copies of said master film has been made.

39. A method for copying images on a master microfiche film onto a copy mirocfiche film comprising:

unwinding master film from a master payout station and copy film from a copy payout station by operating drive means, which engage said copy film;

bringing said master film and said copy film together to form a master film-copy film laminate;

passing said master film-copy film laminate over an exposure surface;

directing ultraviolet rays through said exposure surface and said master film to said copy film, thereby exposing said copy film;

directing an endless tensioning belt around a plurality of belt rollers having belt-contacting surfaces and being positioned such that said tensioning belt presses said copy film against said master film, which is pressed against said exposure surface, thereby holding said copy film in pressing, substantially non-slipping contact with said master film and holding said master film in pressing, substantially non-slipping contact with the exposure surface such that said master film and said tensioniong belt are passively driven by said drive means by virtue of contact between said copy film and each of said master film and said tensioning belt, and said exposure surface is rotated by virtue of contact with said master film;

collecting said master film at a master take-up station after said master film has passed over said exposure surface;

developing the exposed copy film;

cooling the developed copy film; and collecting the cooled copy film at a copy take-up station.

40. The method of claim 39, wherein said tensioning belt is laterally expanded and contracted as it passes around said belt rollers, said belt rollers having helical grooves formed in said belt-contacting surfaces, said grooves being formed such that upon rotation of each roller which in contact with said tensioning belt, said grooves converge or diverge relative to said tensioning belt.

41. The method of claim 40, wherein said tensioning belt is laterally expanded and contracted alternatingly by said belt-contacting surfaces.

* * * * *